United States Patent [19]
Jacobs

[11] Patent Number: 5,147,036
[45] Date of Patent: Sep. 15, 1992

[54] COMPACT DISC PACKAGING SYSTEM

[76] Inventor: Raphael G. Jacobs, 130 Dean St., Harrington Park, N.J. 07640

[21] Appl. No.: 695,574

[22] Filed: May 3, 1991

[51] Int. Cl.⁵ .............................................. B65D 85/57
[52] U.S. Cl. .................................... 206/232; 206/313
[58] Field of Search ............... 206/307, 309, 310, 312, 206/313, 444; 229/68 R, 72, 76; 266/232

[56] References Cited

U.S. PATENT DOCUMENTS

| | | | |
|---|---|---|---|
| 2,777,574 | 1/1957 | Brody | 206/313 |
| 2,881,913 | 4/1959 | Kursh | 206/313 |
| 3,876,134 | 4/1975 | Rice et al. | 206/312 |
| 4,355,718 | 10/1982 | Hagelberg | 206/312 |
| 4,635,792 | 1/1987 | Yamada et al. | 206/312 |
| 4,730,727 | 3/1988 | Petroff | 229/72 |
| 4,850,731 | 7/1989 | Youngs | 206/313 |
| 4,899,875 | 2/1990 | Herr et al. | 206/313 |
| 5,048,681 | 9/1991 | Henkel | 206/313 |

FOREIGN PATENT DOCUMENTS

| | | | |
|---|---|---|---|
| 0269159 | 6/1988 | European Pat. Off. | 206/309 |
| 0335826 | 10/1989 | European Pat. Off. | 206/309 |
| 8702565 | 5/1989 | Netherlands | 206/444 |
| 2141998 | 1/1985 | United Kingdom | 206/444 |

Primary Examiner—Jimmy G. Foster
Attorney, Agent, or Firm—Samuelson & Jacob

[57] ABSTRACT

A compact disc package includes a protective envelope for receiving a compact disc and a protective jacket having a pouch for receiving the protective envelope with the compact disc therein, the protective envelope having a pocket with a depth less than one-half the diameter of the compact disc for retaining the compact disc within the pocket with a major portion of the compact disc and a major portion of the central aperture of the compact disc exposed for grasping, when the protective envelope is opened, and a tapered envelope portion for facilitating insertion of the protective envelope into the pouch of the protective jacket, when the protective envelope is closed, the protective jacket further including a plurality of panels arranged for folding to retain the protective envelope, with the compact disc therein, securely within the protective jacket.

15 Claims, 4 Drawing Sheets

COMPACT DISC PACKAGING SYSTEM

The present invention relates generally to the packaging of compact discs and pertains, more specifically, to a compact disc storage and transportation packaging system which itself is limited in size, in keeping with the compact nature of compact discs, and facilitates use of the compact disc.

Since the advent of compact disc technology, the compact disc has become the medium of choice for home music systems. As a result of widespread acceptance, compact discs largely have supplanted long playing records and are affecting the sales of audio tape cassettes in the home entertainment market. Currently, compact discs are packaged in small cases, known as "jewel boxes", and are marketed in larger packages constructed of cardboard or of synthetic polymeric materials. These cases, and the attendant packages, are somewhat bulky and difficult to use. Recently, the compact disc industry has been investigating alternate packaging techniques which could yield a packaging system more in keeping with the compact nature of compact discs, and more ecologically sound. In addition, there is a need for a package which facilitates the handling of the compact disc as it is removed from the package for use and is returned to the package after use, especially when the compact disc is used in connection with automotive compact disc players and similar portable units, where storage space is at a premium and handling must be uncomplicated.

The present invention provides a packaging system for compact discs which responds to the above-outlined requirements and which exhibits several objects and advantages, some of which may be summarized as follows: Provides exemplary protection for a compact disc under all conditions encountered during storage and transportation of the compact disc; enables increased ease of handling a compact disc, during transportation and storage, as well as when placing the compact disc into the package and when withdrawing the compact disc from the package for use; provides an ecologically sound packaging system, utilizing materials and dimensions conducive to the conservation of resources and space, as well as facilitating waste disposal; enables the ready packaging of adequate textual materials pertaining to the information carried by the compact disc in the package; provides a compact package for multiple compact disc sets, with exemplary protection provided for each compact disc of the set; enables a practical and economical packaging system for effective storage and transportation of compact discs, with increased ease of access to the compact discs packaged in the system; provides a packaging system which is economically manufactured in large quantities of uniform high quality for widespread acceptance.

The above objects and advantages, as well as further objects and advantages, are attained by the present invention which may be described briefly as a packaging system for the transportation and storage of a compact disc having a central aperture and a predetermined diameter, the packaging system comprising: a protective envelope for receiving the compact disc; a protective jacket for receiving the protective envelope with the compact disc placed within the envelope; the protective envelope including a back sheet having a bottom edge, a top edge, a length extending longitudinally between the bottom edge and the top edge, opposite side edges and a width extending laterally between the opposite side edges, the length and width each corresponding essentially to the predetermined diameter of the compact disc; an intermediate sheet having a bottom edge and being integral with the back sheet along the respective bottom edges of the back sheet and the intermediate sheet, the intermediate sheet extending laterally across the back sheet from adjacent one of the opposite side edges to adjacent the other of the opposite side edges to establish a pocket between the back sheet and the intermediate sheet, the intermediate sheet including a top edge and a length extending longitudinally between the top edge and the bottom edge of the intermediate sheet, the length of the intermediate sheet, all along the width of the intermediate sheet, being less than one-half the predetermined diameter of the compact disc such that the pocket includes an opening at the top edge of the intermediate sheet and a longitudinal depth between the bottom edge of the intermediate sheet and the opening less than one-half the predetermined diameter of the compact disc so as to maintain at least a major portion of the compact disc ard at least a major portion of the central aperture of the compact disc outside the pocket and thereby exposed for grasping when the compact disc is seated in the pocket; and a front sheet having a top edge and being integral with the back sheet along the respective top edges of the front sheet and the back sheet, the front sheet having opposite side edges and a width extending laterally between the opposite side edges such that upon folding the front sheet into juxtaposition with the back sheet, the respective opposite side edges of the front sheet and of the back sheet will be juxtaposed, the front sheet further having a length extending longitudinally from the top edge a distance greater than one-half the diameter of the compact disc so as to overlap the opening of the pocket and enclose the compact disc, when seated in the pocket, between the front sheet and the back sheet; the protective jacket including a first panel having a top edge, a bottom edge, a length extending longitudinally between the tcp edge and the bottom edge, opposite side edges and a width extending laterally between the opposite side edges; a second panel having opposite side edges and a width extending laterally between the opposite side edges, the second panel being integral with the first panel along corresponding respective side edges of the first and second panels; a first fold line along said corresponding respective side edges for enabling folding of the first panel into juxtaposition with the second panel, the relative dimensions of the first and second panels being such that upon such juxtaposition of the first and second panels, the corresponding respective opposite side edges of the first and second panels are brought into close proximity with one another; a third panel having opposite side edges and a width extending laterally between the opposite side edges, the third panel being integral with the second panel along corresponding respective side edges of the second and third panels, opposite the corresponding side edges along which the first and second panels are joined; and a second fold line along said corresponding respective side edges where the third panel is integral with the second panel for enabling folding of the third panel into juxtaposition with the first and second panels, with the first panel interposed between the second and third panels; the first panel including a pouch having an opening along the side edge of the first panel opposite the first fold line, the relative dimensions of the pouch and the protective envelope being such that the protective envelope may be inserted selectively into the pouch; whereby upon insertion of the compact disc into the protective envelope and insertion of the protective envelope into the pouch, and subsequently folding the first and third panels into said juxtaposition with the second panel, the opening of the pouch will be secured between the second and third panels, adjacent the second fold line, to close the opening of the pouch and secure the protective envelope, and the compact disc therein, within the protective jacket.

The invention will be understood more fully, while still further objects and advantages will become apparent, in the following detailed description of preferred embodiments of the invention illustrated in the accompanying drawing, in which.

Referring now to the drawing, and especially to FIGS. 1 through 4 thereof, a compact disc packaging system constructed in accordance with the invention is illustrated generally at 20 and is seen to be arranged for the packaging of a compact disc 22 of the type having information encoded, for access from one side 24 thereof, and text printed on the other side 26. Compact disc 22 has a predetermined diameter, an outer perimeter 27 and a central aperture 28, all as is now well known in compact disc technology.

Figures 1, 2:
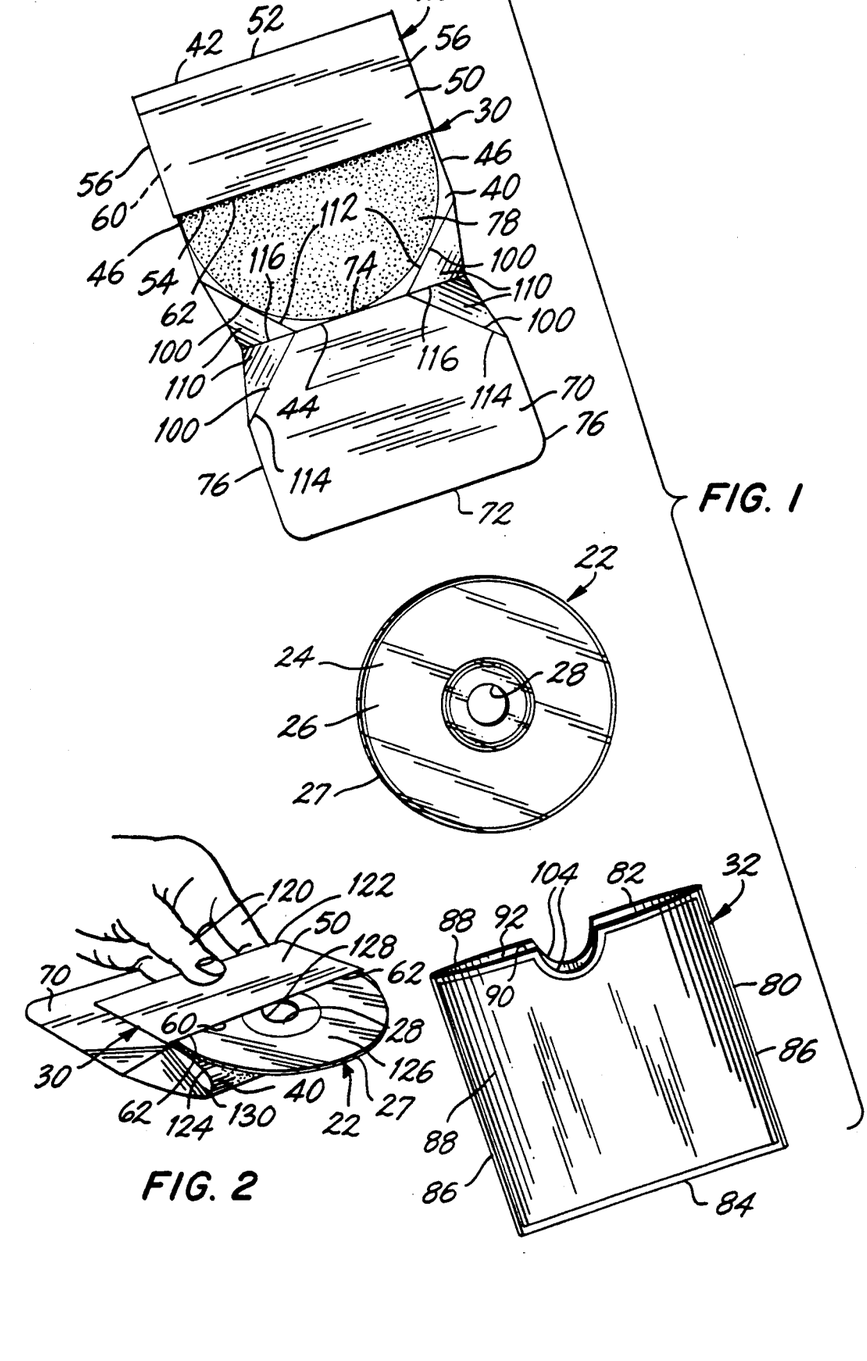
FIG. 1 is an exploded pictorial view of a compact disc packaging system constructed in accordance with the invention.
FIG. 2 is a pictorial illustration of a portion of the packaging system in use.

Compact disc packaging system 20 includes a protective envelope 30 for receiving the compact disc 22 and for subsequent insertion into a protective jacket 32 to package the compact disc 22 for storage and transportation, as required. Protective envelope 30 has a back sheet 40 including a bottom edge 42 and a top edge 44, between which edges 42 and 44 the protective envelope 30 has a longitudinal length, and opposite side edges 46, between which side edges 46 the protective envelope has a lateral width, the length and width corresponding essentially to the predetermined diameter of the compact disc 22.

An intermediate sheet 50 has a bottom edge 52 and a top edge 54 and is integral with the back sheet 40 along the bottom edges 42 and 52. Intermediate sheet 50 extends laterally across the back sheet 40, from adjacent one of the opposite side edges 46 to adjacent the other of the opposite side edges 46, and itself extends laterally between opposite side edges 56 so as to be integral with the back sheet 40 at corresponding side edges 46 and 56 and establish a pocket 60 between the intermediate sheet 50 and the back sheet 40. Intermediate sheet 50 is free of the back sheet 40 along the top edge 54 to establish an opening 62 into pocket 60 along the top edge 54. The longitudinal length of the intermediate sheet 50 between the to edge 54 and the bottom edge 52, and hence the depth of the pocket 60, is less than one-half the length of the back sheet 40, all across the entire width of the opening 62, and hence less than one-half the predetermined diameter of the compact disc 22, so that the depth of the pocket 60, all across the entire width of the pocket 60, is less than the radius of the compact disc 22. Thus, upon placement of the compact disc 22 in the pocket 60, and fully seating the compact disc 22 within the pocket 60, a major portion of the central aperture 28 is exposed, along with a major portion of the compact disc 22, for reasons which will be explained in greater detail below.

Figure 3:
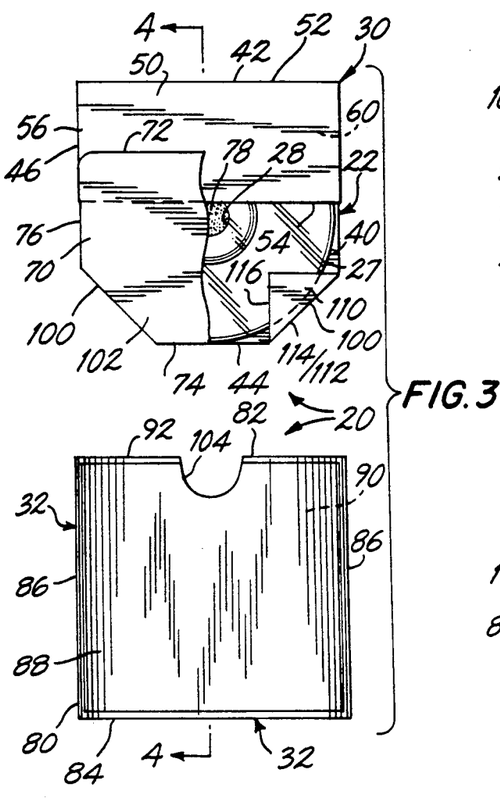
FIG. 3 is a front elevational view, partially broken away, showing the packaging system in another stage of use.
Figure 4:
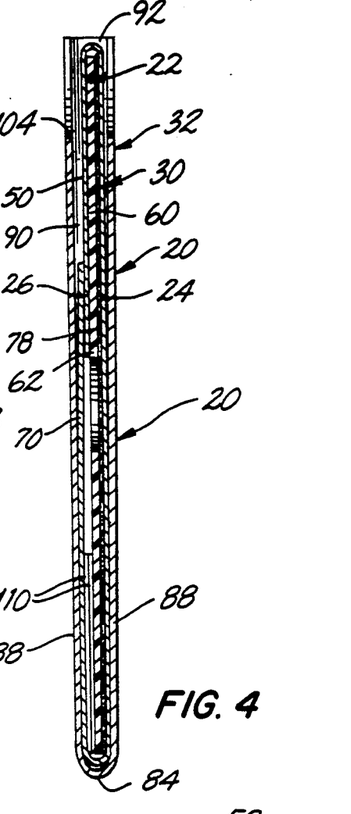
FIG. 4 is an enlarged cross-sectional view taken along line 4—4 of FIG. 3, with the component parts assembled.

Protective envelope 30 includes a front sheet 70 having a bottom edge 72 and a top edge 74, between which edges 72 and 74 the front sheet 70 has a longitudinal length. The width of the front sheet 70 extends laterally between opposite side edges 76. Front sheet 70 is integral with back sheet 40 along the respective top edges 44 and 74 and the relative dimensions of the front sheet 70 and the back sheet 40 are such that upon folding the front sheet 70 into juxtaposition with the back sheet 40, the respective opposite side edges 46 and 76 will be juxtaposed. The longitudinal length of the front sheet 70 is greater than one-half the diameter of the compact disc 22 so as to overlap the opening 62 of the pocket 60 and serve as a cover to enclose the compact disc 22, when seated in the pocket 60 as shown in FIGS. 3 and 4, between the front sheet 70 and the back sheet 40. A liner 78 of a relatively soft material, such as flocking, is affixed to the back sheet 40 so as to be coextensive with the surface of the one side 24 of the compact disc 22 which exhibits the encoded information for protecting that s,urface against damage which might affect the operation of the compact disc 22.

Protective jacket 32 comprises a panel 80 having a top edge 82, a bottom edge 84, a length extending longitudinally between the top edge 82 and the bottom edge 84, and opposite side edges 86 between which the jacket 32 has a lateral width. Panel 80 is made up of juxtaposed walls 88 joined at the bottom edge 84 and at the side edges 86 to establish a pouch 90 within the panel 80, pouch 90 having an opening 92 at the top edge 82 for the reception of the protective envelope 30, with the compact disc 22 therein, within the pouch 90. The preferred material for the panel 80 is a relatively stiff cardboard so that the walls 88 are relatively rigid and support and protect the compact disc 22 in envelope 30.

In order to facilitate insertion of the protective envelope 30 into the jacket 32, the top edge .44 of the back sheet 40 and the top edge 74 of the front sheet 70 have a lateral extent less than the predetermined diameter of the compact disc 22, and, consequently, less than the width of the front sheet 70 and the back sheet 40. The front sheet 70 and the back sheet 40 each include at least one side edge portion 100 extending in a lateral direction inwardly from the respective opposite side edges 46 and 76 and the width adjacent the opening 62 of the pocket 60 toward the respective top edges 44 and 74 so as to establish an envelope portion 102 tapered from a larger width adjacent the opening 62 of the pocket 60 toward a smaller width at the top edges 44 and 74. In the preferred, illustrated arrangement, side edge portions 100 are provided at each side of the top edges 44 and 74 so that the top edges 44 and 74 are spaced from both respective opposite side edges 46 and 76 and are located so as to be essentially centered laterally intermediate the respective opposite side edges 46 and 76. The tapered envelope portion 102 eases the entry of the protective enve,lope 30 through the opening 92 into the pouch 90 of the protective jacket 32. Once the protective envelope 30, with the compact disc 22 therein, is fully inserted into the protective jacket 32, as seen in FIG. 4, the compact disc 22 is packaged for storage and transportation in a compact manner. For marketing purposes, the protective jacket 32, with the protective envelope 30 and the compact disc 22 therein, may be encased within a thin film packaging material, in a manner now conventional in packaging. Removal of the protective envelope 30 from the protective jacket 32 is facilitated by finger recesses 104 in the walls 88 of the protective jacket 32, at the opening 92 to the pouch 90, through which recesses 104 the fingers of a user can gain access to the protective envelope 30 for withdrawal of the envelope 30 from the jacket 32.

It is noted that the protective envelope 30 includes gusset sections 110 interconnecting the corresponding side edge portions 100 of the back sheet 40 and the front sheet 70. Gusset sections 110 have a generally triangular configuration and are integral, and preferably unitary, with the back sheet 40 and the front sheet 70 along fold lines 112 and 114, respectively, and with one another along a common fold line 116, which enable the gusset sections 110 to be folded over the compact disc 22, as illustrated in FIG. 3, so as to assist in retaining the compact disc 22 in the pocket 60 while maintaining the tapered envelope portion 102 for ease of insertion of the protective envelope 30, and compact disc 22, into the protective jacket 32. Gusset sections 110 serve to reinforce the connection between the front sheet 70 and the back sheet 40 and add to the service life of the protective envelope 30. At the same time, the gusset portions 110 provide added stiffness to the tapered envelope portion 102 for added ease of insertion of the tapered envelope portion 102 into the pouch 90 of the protective jacket 32.

As outlined above, when the protective envelope 30 is withdrawn from the protective jacket 32, and the front sheet 70 is lifted from the back sheet 40 and from the intermediate sheet 50 to expose the intermediate sheet 50 and the compact disc 22 for withdrawal of the compact disc 22 from the pocket 60, the central aperture 28 of the compact disc 22, as well as the compact disc 22 itself, is exposed, as illustrated in FIG. 2, so that handling of the compact disc 22 is facilitated in that the compact disc 22 is exposed sufficiently for grasping along the outer perimeter 27 of the compact disc 22 and along the central aperture 28, in the manner best suited to eliminate contact between a user's fingers, illustrated in FIG. 2 at 120, and the surface of the information-access side 24 of the compact disc 22. In addition, both the back sheet 40 and the intermediate sheet 50 are constructed of a thin, yet tough, highly flexible material, preferably in the form of a paper-like polymeric material having a certain degree of stiffness, such as TYVEK, which also exhibits excellent tear strength, so that the combined compact disc 22 and protective envelope 30 may be grasped along the intermediate sheet 50 and the counterpart area 122 of the back sheet 40, as illustrated in FIG. 2, and the remainder 124 of the back sheet 40 may be bent back, as seen in FIG. 2, to expose the unpocketed major portion 126 of the compact disc 22, and the unpocketed major portion 128 of central aperture 28, for direct insertion of the compact disc 22 into a compact disc player (not shown), and direct removal of the compact disc 22 from a compact disc player, without the necessity for any direct contact between the fingers 120 and the compact disc 22. Since the longitudinal length of the pocket 60, and the depth of the pocket 60, are limited to less than one-half the diameter of the compact disc 22 all along the entire width of the intermediate sheet 50, and the pocket 60, the back sheet 40 is bent back readily along a lateral area 130 in the vicinity of the opening 62 of the pocket 60 to accomplish exposure of the maJor portion 126 of the compact disc 22, and the major portion 128 of the central aperture 28, with ease. This procedure is especially helpful in handling a compact disc 22 for insertion into and release from an automotive compact disc player or a portable compact disc player where ease of handling by only one hand is desirable.

Figures 5, 6:
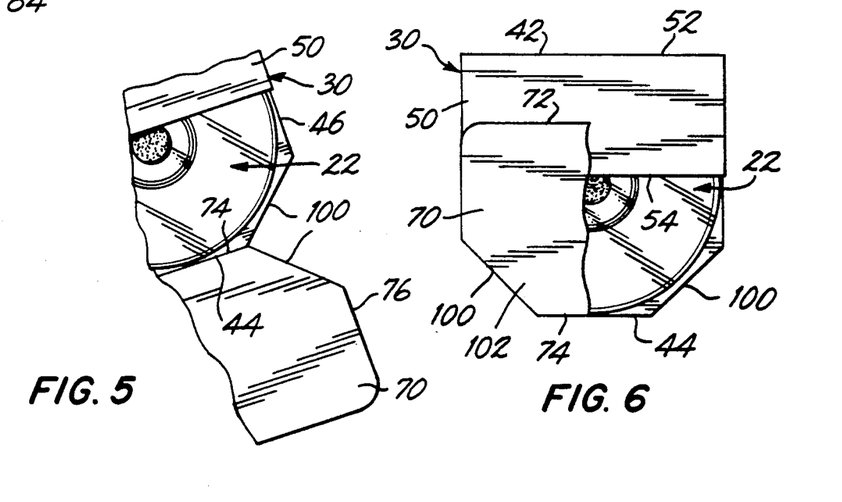
FIG. 5 is a fragmentary pictorial view similar to a portion of FIG. 1, but illustrating another embodiment of the invention.
FIG. 6 is a front elevational view of a portion of the packaging system of FIG. 5.

Turning now to FIGS. 5 and 6, another embodiment of the invention is illustrated, wherein the side edge portions 100 of the protective envelope 30 are merely cut into the protective envelope 30 without reinforcing gusset sections. Where the material of the envelope 30 has sufficient stiffness and a relatively high tear strength, such as exhibited by TYVEK, adequate performance is available without the additional reinforcement provided by gusset sections.

Figure 7:
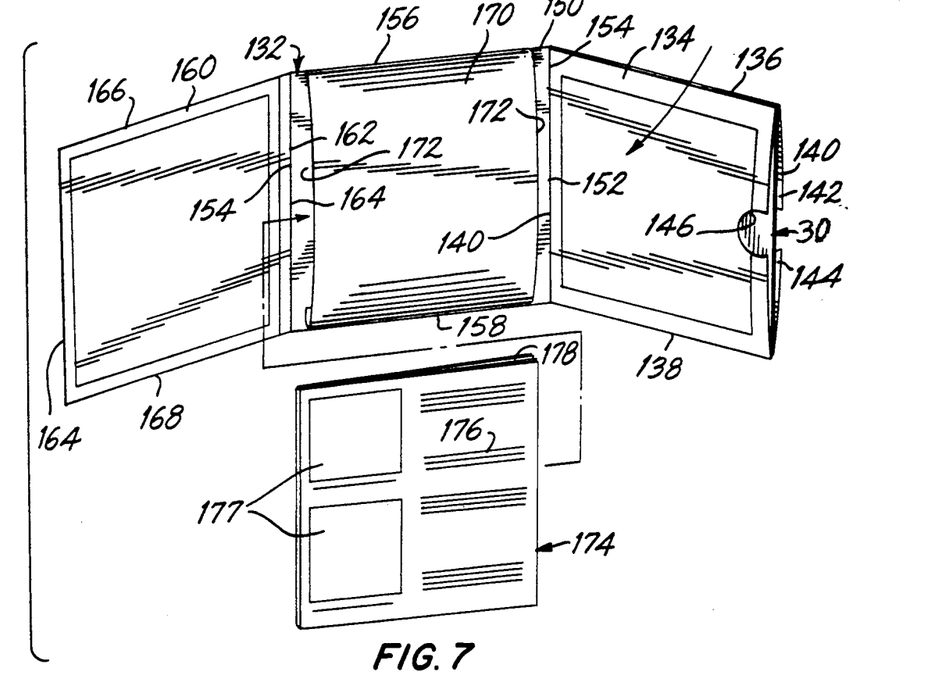
FIG. 7 is an exploded pictorial view of a compact disc packaging system showing still another embodiment of the invention.
Figure 8:
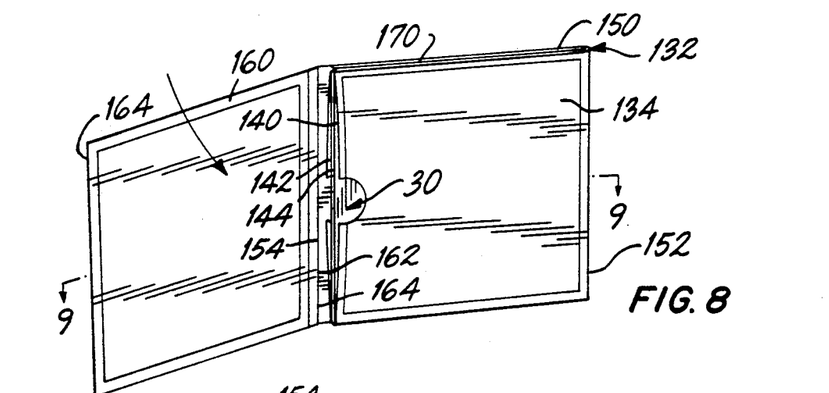
FIG. 8 is a pictorial view of the embodiment of FIG. 7 in another operating condition.
Figure 9:
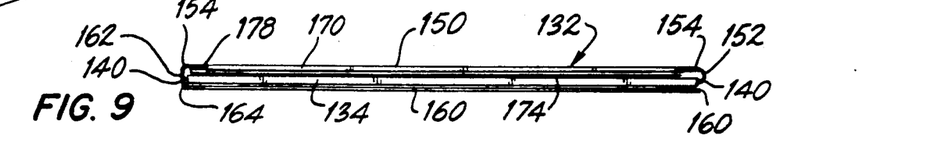
FIG. 9 is an enlarged cross-sectional view taken along line 9—9 of FIG. 8, with the component parts of the packaging system closed.

In the embodiment of FIGS. 7 through 9, an alternate protective jacket 132 is made up of several panels, including a first panel 134 having a top edge 136, a bottom edge 138 and opposite side edges 140. A longitudinal length extends between the top edge 136 and the bottom edge 138, and a lateral width extends between the opposite side edges 140. The first panel 134 includes a pouch 142 for the reception of a protective envelope 30, and a compact disc 22 therein. The pouch 142 includes an opening 144 which extends along one of the opposite side edges 140, with finger recesses 146 associated with the opening 144. First panel 134 is joined to a second panel 150 along a common fold line 152 located at the other of the opposite side edges 140 of the first panel 134 and one of the opposite side edges 154 of the second panel 150. Second panel 150 also includes a top edge 156 and a bottom edge 158, with a corresponding longitudinal length extending between the top edge 156 and the bottom edge 158, and a corresponding width extending laterally between the opposite side edges 154. A third panel 160 is integral with the second panel 150 at a fold line 162 extending along one of the opposite side edges 164 of the third panel 160 and the other of the opposite side edges 154 of the second panel 150. Third panel 160 further includes a top edge 166 and a bottom edge 168, with a lateral width extending between the opposite side edges 164 and a longitudinal length extending between the top edge 166 and the bottom edge 168.

A retainer in the form of a sleeve 170 is integral with the second panel 150 and extends longitudinally between the top edge 156 and the bottom edge 158 of the second panel 150, the sleeve 170 having opposite entrances 172, either one of which entrances 172 will receive a book 174 of printed textual material, including text 176 and graphics 177, pertaining to the information encoded in the compact disc 22. Thus, the back page 178 of the book 174 is slipped into the sleeve 170 for securement of the book 174 to the second panel 150, while allowing access to the pages of the book 174 with the book 174 secured to the second panel 150. The ability to include an entire book 174 of textual material assures that adequate textual material will be accommodated in the protective jacket 132. With the book 174 so secured, the first panel 134 is folded about fold line 152 into juxtaposition with the second panel 150, as seen in FIG. 8, with the book 174 interposed between the first panel 134 and the second panel 150. Upon such folding of the first panel 134 into juxtaposition with the second panel 150, the opening 144 to pouch 142 is brought into close proximity with the fold line 162 between the second panel 150 and the third panel 160, and the corresponding side edges 154 and 164. The third panel 160 then is folded into juxtaposition with the first panel 134 and the second panel 150, with the first panel 134 interposed between the second panel 150 and the third panel 160. In this manner, the opening 144 to the pouch 142 is closed securely by the second panel 150 and the third panel 160 within the protective jacket 132, and the protective envelope 30, with the compact disc 22 therein, is provided with added security against inadvertent movement in the direction out of the pouch 142, all in a compact arrangement in keeping with the compact nature of the compact disc 22. The relative dimensions of the first, second and third panels 134, 150 and 160 are such that upon juxtaposition of the panels, as shown in FIG. 9, the corresponding respective opposite side edges 140, 154 and 164 are brought into close proximity with one another.

Figure 10:
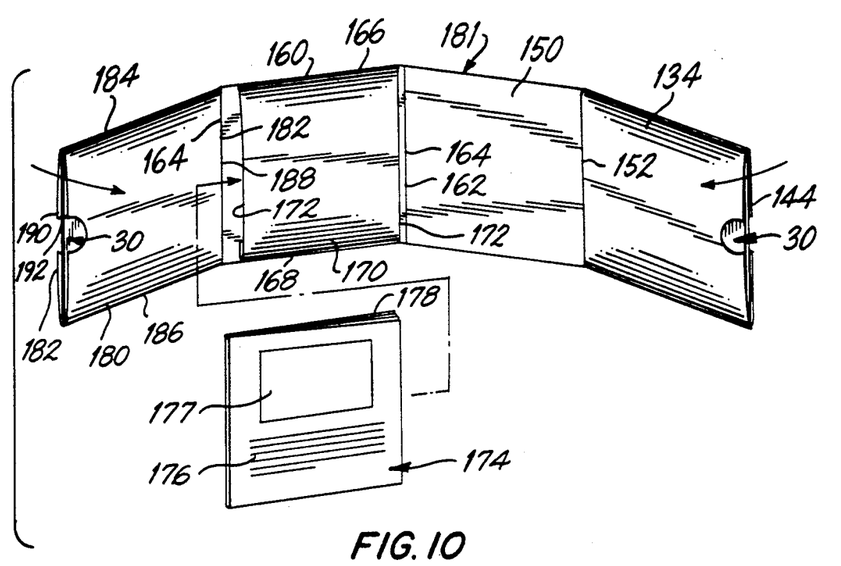
FIG. 10 is an exploded pictorial view of yet another embodiment of the invention.
Figure 11:
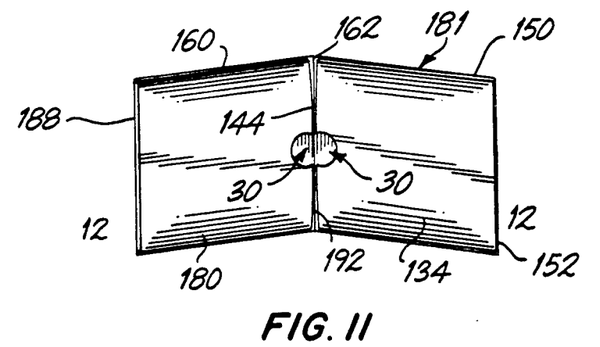
FIG. 11 is a pictorial view of the embodiment of FIG. 10 in another operating condition.
Figure 12:
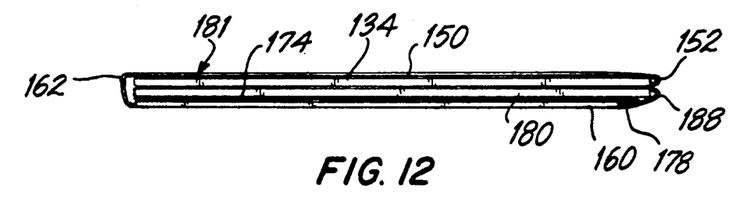
FIG. 12 is an enlarged cross-sectional view taken along line 12—12 of FIG. 11, with the component parts closed.

In the embodiment of FIGS. 10 through 12, a fourth panel 180 is added to the construction which includes the three panels 134, 150 and 160 described in connection with the embodiment of FIGS. 7 through 9 to establish yet another protective jacket 181. The fourth panel 180 is integral with the third panel 160 at the other of the opposite side edges 164, and itself includes opposite side edges 182, a top edge 184 and a bottom edge 186. A fold line 188 extends along a side edge 182, where the fourth panel 180 is joined with the third panel 160, and a second pouch 190 is provided in the protective jacket 181, in the fourth panel 180, with an opening 192 extending longitudinally along the opposite side edge 182. A second protective envelope 30, with a second compact disc 22 therein, may be placed within the second pouch 190 s that the protective jacket 181 serves to store a set of two compact discs 22. In this instance, sleeve 170 extends between top edge 166 of the third panel 160 and bottom edge 168 to retain book 174 on the third panel 160. Both the first panel 134 and the fourth panel 180 are folded along the respective fold lines 152 and 188 so that the openings 144 and 192 are brought into confronting relationship, as seen in FIG. 11. Then the second and third panels 150 and 160 are folded along common fold line 162 to close the openings 144 and 192 securely between the second and third panels 150 and 160 for a secure, compact package, as illustrated in FIG. 12. The relative dimensions cf the first, second, third and fourth panels 134, 150, 160 and 180 are such that upon such juxtaposition of the panels, the corresponding respective opposite side edges 140, 154, 164 and 182 are brought into close proximity with one another.

It will be see that the present invention exhibits the several objects and advantages summarized above, namely: Provides exemplary protection for a compact disc under all conditions encountered during storage and transportation of the compact disc; enables increased ease of handling a compact disc, during transportation and storage, as well as when placing the compact disc into the package and when withdrawing the compact disc from the package for use; provides an ecologically sound packaging system, utilizing materials and dimensions conducive to the conservation of resources and space, as well as facilitating waste disposal; enables the ready packaging of adequate textual materials pertaining to the information carried by the compact disc in the package; provides a compact package for multiple compact disc sets, with exemplary protection provided for each compact disc of the set; enables a practical and economical packaging system for effective storage and transportation of compact discs, with increased ease of access to the compact discs packaged in the system; provides a packaging system which is economically manufactured in large quantities of uniform high quality for widespread acceptance.

It is to be understood that the above detailed description of preferred embodiments of the invention are provided by way of example only. Various details of design and construction may be modified without departing from the true spirit and scope of the invention as set forth in the appended claims.

The embodiments of the invention in which an exclusive property or privilege is claimed are defined as follows:

1. A protective envelope for use in a packaging system for the transportation and storage of a compact disc having a central aperture and a predetermined diameter, the protective envelope comprising:

a back sheet having a bottom edge, a top edge, a length extending longitudinally between the bottom edge and the top edge, opposite side edges and a width extending laterally between the opposite side edges, the length and width each corresponding essentially to the predetermined diameter of the compact disc;

an intermediate sheet having a bottom edge and being integral with the back sheet along the respective bottome dges of the back sheet and the intermediate sheet, the intermediate sheet extending laterally across the back sheet from adjacent one of the opposite side edges to adjacent the other of the opposite side edges to establish a pocket between the back sheet and the intermediate sheet, the intermediate sheet including a top edge and a length extending longitudinally between the top edge and the bottom edge of the intermediate sheet, the length of the intermediate sheet, all along the width fo the intermediate sheet, being less than one-half the predetermined diameter of the compact disc such that the pocket includes an opening at the top edge of the intermediate sheet and a longitudinal depth between the bottom edge of the intermediate sheet and the opening less than one-half the predetermined diameter of the compact disc so as to maintain at least a major portion of the compact disc and at least a major portion of the central aperture of the compact disc outside the pocket and thereby exposed for grasping when the compact disc is seated in the pocket; and a front sheet having a top edge and being integral with the back sheet along the respective top edges of the front sheet and the back sheet, the front sheet having opposite side edges and a width extending laterally between the opposite side edges such that upon folding the front sheet into juxtaposition with the back sheet, the respective opposite side edges of the front sheet and of the back sheet will be juxtaposed, the front sheet further having a length extending longitudinally from the top edge a distance greater than one-half the diameter of the compact disc so as to overlap the opening of the pocket and enclose the compact disc, when seated in the pocket, between the front sheet and the back sheet;

including a protective jacket within whcih the protective envelope is inserted when the compact disc is placed in the protective envelope; and the top edge of the back sheet and the top edge of the front sheet each have a lateral extent less than the predetermined diameter of the compact disc; and the front sheet and the back sheet each include at least one side edge portion extending in a direction laterally inwardly from the width adjacent the opneing of the pocket, corresponding to the predetermined diameter of the compact disc, toward the respective top edges so as to establish an envelope portion tapered from a larger width adjacent the opneing of the pocket, toward a smaller width at the top edges for facilitating insertion of the envelope portion and the protective envelope into the protective jacket.

2. The invention of claim 1 wherein the front sheet and the back sheet each include opposite side edge portions extending in corresponding opposite directions laterally inwardly so as to establish the tapered envelope portion.

3. The invention of claim 2 including gusset sections interconnecting the respective side edge portions of the back sheet and the front sheet, the gusset sections being foldable along the respective side edge portions to maintain the tapered envelope portion when the front sheet is folded into juxtaposition with the back sheet.

4. The invention of claim 1 including gusset sections interconnecting the respective side edge por ions of the back sheet and the front sheet, the gusset sections being foldable along the respective side edge portions to maintain the tapered envelope portion when the front sheet is folded into juxtaposition with the back sheet.

5. The invention of claim 5 wherein the gusset sections have a generally triangular configuration and fold inwardly over the compac disc to assist in retaining the compact disc in the pocket.

6. The invention of claim 1 including a liner of a material softer than.the back sheet, the liner being affixed to the back sheet so as to be coextensive with a confronting surface of the compact disc when the compact disc is seated in the pocket.

7. The invention of claim 1 wherein the back sheet, front sheet and intermediate sheet are constructed of a relatively thin, flexible material such as a paper-like polymeric material.

8. A packaging system for the transportation and storage of a compact disc having a central aperture and a predetermined diameter, the packaging system comprising:

a protective envelope for receiving the compact disc;

a protective jacket for receiving the protective envelope with the compact disc placed within the envelope;

the protective envelope including a back sheet having a bottom edge, a top edge, a length extending longitudinally between the bottom edge and the top edge, opposite side edges and a width extending laterally between the opposite side edges, the length and width each corresponding essentially to the predetermined diameter of the compact disc;

an intermediate sheet having a bottom edge and being integral with the back sheet along the respective bottom edges of the back sheet and the intermediate sheet, the intermediate sheet extending laterally across the back sheet from adjacent one of the opposite side edges to adjacent the other of the opposite side edges to establish a pocket between the back sheet and the intermediate sheet, the intermediate sheet including a top edge and a length extending longitudinally between the top edge and the bottom edge of the intermediate. sheet, the length of the intermediate sheet, all along the width of the intermediate sheet, being less than one-half the predetermined diameter of the compact disc such that the pocket includes an opening at the top edge of the intermediate sheet and a longitudinal depth between the bottom edge of the intermediate sheet and the opening less than one-half the predetermined diameter of the compact disc so as to maintain at least a major portion of the compact disc and at least a major portion of the central aperture of the compact disc outside the pocket and thereby exposed for grasping when the compact disc is seated in the pocket; and a front sheet having a top edge and being integral with the back sheet along the respective top edges of the front sheet and the back sheet, the front sheet having opposite side edges and a width extending laterally between the opposite side edges such that upon folding the front sheet into juxtaposition with the back sheet, the respective opposite side edges of the front sheet and of the back sheet will be juxtaposed, the front sheet further having a length extending longitudinally from the top edge a distance greater than one-half the diameter of the compact disc so as to overlap the opening of the pocket and enclose the compact disc, when seated in the pocket, between the front sheet and the back sheet;

the protective jacket including a first panel having a top edge, a bottom edge, a length extending longitudinally between the top edge and the bottom edge, opposite side edges and a width extending laterally between the opposite side edges;

a second panel having opposite side edges and a width extending laterally between the opposite side edges, the second panel being integral with the first panel along corresponding respective side edges of the first and second panels;

a first fold line along said corresponding respective side edges for enabling folding of the first panel into juxtaposition with the second panel, the relative dimensions of the first and second panels being such that upon such juxtaposition of the first and second panels, the corresponding respective opposite side edges of the first and second panels are brought into close proximity with one another;

a third panel having opposite side edges and a width extending laterally between the opposite side edges, the third panel being integral with the second panel along corresponding respective side edges of the second and third panels, opposite the corresponding side edges along which the first and second panels are joined; and a second fold line along said corresponding respective side edges where the third panel is integral with the second panel for enabling folding of the third panel into juxtaposition with the first and second panels, with the first panel interposed between the second and third panels;

the first panel including a pouch having an opening along the side edge of the first panel opposite the first fold line, the relative dimensions of the pouch and the protective envelope being such that the protective envelope may be inserted selectively into the pouch;

whereby upon insertion of the compact disc into the protective envelope and insertion of the protective envelope into the pouch, and subsequently folding the first and third panels into said juxtaposition with the second panel, the opening of the pouch will be secured between the second and third panels, adjacent the second fold line, to close the opening of the pouch and secure the protective envelope, and the compact disc therein, within the protective jacket.

9. The invention of claim 8 wherein:

the top edge of the back sheet and the top edge of the front sheet each have a lateral extent less than the predetermined diameter of the compact disc; and the front sheet and the back sheet each include at least one side edge portion extending in a direction laterally inwardly from the width adjacent the opening of the pocket, corresponding to the predetermined diameter of the compact disc, toward the respective top edges so as to establish an envelope portion tapered from a larger width adjacent the opening of the pocket, toward a smaller width at the top edges for facilitating insertion of the envelope portion and the protective envelope into the protective jacket.

10. The invention of claim 8 wherein the relative dimensions of the first and third panels are such that upon juxtaposition of the first and third panels, the corresponding respective opposite side edges of the first and third panels are brought into close proximity with one another.

11. The invention of claim 8 including a retainer on the second panel, the retainer confronting the first and third panels upon folding of the first and third panels into said juxtaposition with the second panel, said retainer being arranged for accommodating a book of textual material pertaining to the information carried by the compact disc.

12. The invention of claim 11 wherein the second panel includes a top edge and a bottom edge and the retainer comprises a sleeve extending from the top edge of the second panel to the bottom edge of the second panel, the sleeve having an entrance for receiving at least one page of the book of textual material.

13. The invention of claim 8 wherein the prorective jacket is constructed to accommodate a further compact disc in a further protective envelope, the protective jacket including:

a fourth panel having opposite side edges and a width extending laterally between the opposite side edges, the fourth panel being integral with the third panel along corresponding respective side edges of the third and fourth panels, opposite the corresponding side edges along which the second and third panels are joined, for enabling folding of the fourth panel into juxtaposition with the first, second and third panels, with the fourth panel interposed between the first and third panels;

the fourth panel including a further pouch having an opening along the side edge of the fourth panel opposite the side edge of the fourth panel along which the fourth panel is joined with the third panel, the relative dimensions of the further pouch and the further protective envelope being such that the further protective envelope may be inserted selectively into the pouch;

whereby upon insertion of the further compact disc into the further protective envelope and insertion of the further protective envelope into the further pouch, and subsequently folding the third and fourth panels into said juxtaposition with the first and second panels, the opening of the further pouch will be secured between the second and third panels, at the side edge of the second panel where the second and third panels are joined, to close the opening of the further pouch and secure tne further protective envelope, and the further compact disc therein, within the protective jacket.

14. The invention of claim 13 including a retainer on at least one of the second panel and the third panel, the retainer confronting one of the first panel and fourth panel upon folding of the first and fourth panels into said juxtaposition with the second and third panels, said retainer being arranged for accommodating a book of textual material pertaining to the information carried by the compact discs.

15. The invention of claim 14 wherein the fourth panel includes a top edge and a bottom edge and the retainer comprises a sleeve extending between the top edge of the fourth panel and the bottom edge of the fourth panel, the sleeve having an entrance for receiving at least one page of the book of textural material.

* * * * *